(12) United States Patent
Zell

(10) Patent No.: US 7,662,459 B1
(45) Date of Patent: Feb. 16, 2010

(54) VERSATILE HONEYCOMB MATRIX HEAT SHIELD

(75) Inventor: Peter T. Zell, Moss Beach, CA (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 0 days.

(21) Appl. No.: 12/175,379

(22) Filed: Jul. 17, 2008

(51) Int. Cl.
*B64C 1/06* (2006.01)
*B32B 3/12* (2006.01)

(52) U.S. Cl. .................. 428/116; 244/123.5; 244/123.6; 428/117

(58) Field of Classification Search .................. 428/116, 428/117, 118, 119; 244/171.7, 171.8, 99.1, 244/121, 119, 123.13, 123.12, 123.4, 123.5, 244/133, 117 A; 52/81.1, 81.2, 81.4, 202, 52/576, 578, 784.14, 784.15, 787.11, 793.11
See application file for complete search history.

*Primary Examiner*—Timothy M Speer
*Assistant Examiner*—Gordon R Baldwin
(74) *Attorney, Agent, or Firm*—John F. Schipper; Robert M. Padilla

(57) ABSTRACT

A thermal protection system for atmospheric entry of a vehicle, the system including a honeycomb structure with selected cross sectional shapes that receives and holds thermally cured thermal protection (TP) blocks that have corresponding cross sectional shapes. Material composition for TP blocks in different locations can be varied to account for different atmospheric heating characteristics at the different locations. TP block side walls may be attached to all, or to less than all, the corresponding honeycomb structure side walls.

16 Claims, 2 Drawing Sheets

VERSATILE HONEYCOMB MATRIX HEAT SHIELD

ORIGIN OF THE INVENTION

This invention was made, in part, by one or more employees of the U.S. government and may be made, used and/or sold by the U.S. government without payment of royalties or other compensation thereon.

FIELD OF THE INVENTION

This invention relates to thermal protection systems for vehicles entering or re-entering an atmosphere.

BACKGROUND OF THE INVENTION

When an entrant vehicle enters or re-enters an atmosphere adjacent to a surface of a planet or satellite body, the atmospheric density at the entrant vehicle surface abruptly increases from substantially zero ($\approx 1$ particle/cm$^3$) to a value at least millions of times as large in a very short time interval, of the order of a few seconds for a vehicle that enters or re-enters at velocities of the order of 10,000-30,000 kilometers per hour. This transition causes an abrupt and sustained increase in heating at and adjacent to surfaces exposed to the atmosphere, and the associated surface temperatures can exceed 3000° F. for an extended period.

What is needed is a heat shield for an entrant vehicle that can withstand the anticipated surface temperatures and that can be adapted to correspond to different entrant configurations of the vehicle (entrant velocity, entrant angle, atmosphere density distribution, etc.)

SUMMARY OF THE INVENTION

These needs are met by the invention, which provides a honeycomb matrix heat shield with honeycomb components that can be varied according to the anticipated heat dissipation needs of the entrant vehicle. The heat shield includes a honeycomb structure having thermal protection (TP) blocks inserted within each honeycomb aperture, where each TP block is thermally cured before insertion and is adhered to all, or optionally to less than all, of the adjacent walls of the honeycomb structure. The honeycomb structure and inserted TP blocks are positioned on an assembly of planar segments, as substrates, that surround one or more entrant vehicle surfaces that will be initially exposed to entrant heating. The TP blocks may have cross sectional shapes drawn from a variety of configurations, and the material compositions of the blocks may be varied across the surface to account for different anticipated heating distributions.

DESCRIPTION OF BEST MODE OF THE INVENTION

FIGS. 1A-1G illustrate some of the cross sectional shapes of thermal protection (TP) blocks that can be used as inserts in a honeycomb (HC) structure according to the invention. These cross sectional shapes include equilateral triangles (FIG. 1A), isoceles triangles (1B), right triangles (1C), squares (1D), rectangles (1E), symmetrical trapezoids (1F), regular hexagons (1G), and many other suitable shapes.

Figure 1A:
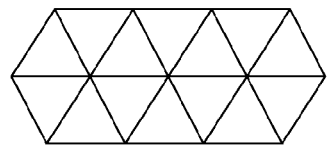
FIGS. 1A-1G illustrate some of the cross sectional shapes of the TP blocks that can be used with the invention.
Figure 1B:
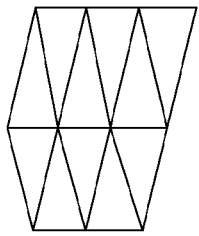
Figure 1C:
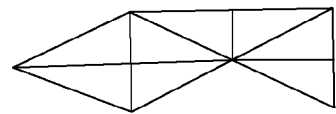
Figure 1F:
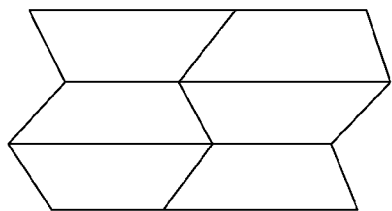
Figure 1E:
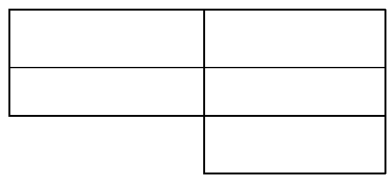
Figure 1D:
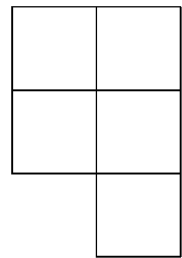
Figure 1G:
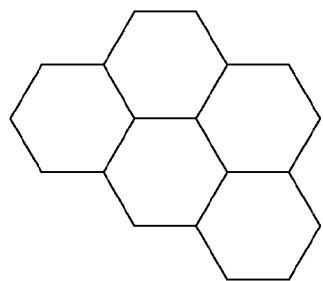
Figure 2:
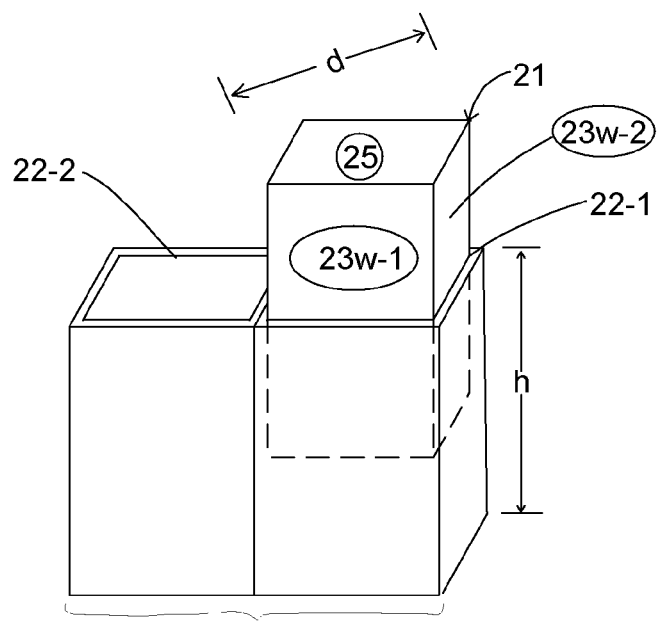
FIG. 2 illustrates insertion of a TP block into a honeycomb matrix aperture.

FIG. 2 illustrates insertion of a TP block 21, having a diameter d=2.5-10 cm, or larger if desired, and a depth h=2-12 cm, or larger if desired, into an aperture 22-1 defined by part of a HC structure 24. An adjacent aperture 22-2 does not yet have a TP block inserted therein. The TP block 21 is thermally cured before insertion into the HC structure, by exposing the TP block to heating temperatures up to about 400° F. for time intervals of length 30-180 min.

In a preferred embodiment, two or more (but less than all) contiguous side walls, 23$w$-1 and 23$w$-2, of the TP block 21 have thicknesses of the order of 0.04-0.08 cm are provided with a suitable adhesive that allows these TP side walls to adhere to corresponding walls of an aperture 22-1 of the HC structure. In a preferred embodiment, all side walls of a TP block 21 are provided with adhesive.

By providing adhesive on at least two contiguous side walls, but less than all of the sidewalls, of the TP block 21, the TP block can be allowed to thermally expand in the presence of atmospheric heating, partly independently of the thermal expansion of the confining HC structure. Where the HC structure pattern is triangular (e.g., FIGS. 1A, 1B and 1C), adhesive is optionally provided for one side wall or for two contiguous side walls of the corresponding triangular cross section TP block, to allow for thermal expansion of the TP block relative to the HC structure. Where the HC structure is an M-gon (M=4, 5, 6, etc.), m=2, 3, . . . , M−1 contiguous side walls of the corresponding M-gon TP block are optionally provided with adhesive, to allow for thermal expansion of the TP block relative to the HC structure. Alternatively, all walls of the TP block are provided with adhesive.

Each TP block 21 includes a selected TP material, such as PICA, SLA, carbon ablator and similar thermal protection materials, where an individual block may have an approximately uniform material composition. One composition of PICA (phenolic impregnated carbon ablator) is disclosed in U.S. Pat. No. 6,955,853, which is incorporated by reference herein. A composition of SLA (super lightweight ablator, a carbon char or silica char) is disclosed in U.S. Pat. No. 4,031,059, which is incorporated by reference herein. A combination of PICA and SLA thermal protection materials has been used in at least one space vehicle application, the Space Probe vehicle developed by Lockheed Martin and used for the Stardust mission that flew through the coma (tail) of the Wild 2 Comet in 2004.

However, two or more TP blocks may have different compositions, depending upon their respective locations in the HC structure, to take account of different anticipated heating environments for different contiguous TP blocks in the HC structure. Through a process of varying the composition of TP blocks in different locations on a heat shield, the weight of the heat shield may be reduced or optimized for a given anticipated heating distribution associated with a specified entrant environment. A first end 25 of each of the TP blocks in FIG. 2 is directly exposed to the atmosphere and will experience the greatest amount of heating. In some instances, a portion of the TP block (preferably, no more than 10-30 percent by volume) will ablate or otherwise chemically dissociate and disappear during (re)entry. Preferably, a second end (not shown in FIG. 2) of a TP block can be provided with adhesive to attach the TP block to an underlying substrate (34-$n$ and 35-$n$ in FIG. 3).

The HC structure provides a structural lattice for insertion of the TP blocks in the lattice and has a material composition, such as carbon phenolic or another suitable material, that is chosen to be compatible with the TP block material. For example, the HC structure material is preferably mechanically and/or thermally stronger than, but should ablate at approximately the same rate as, the TP block material, when exposed to the same entrant thermal environment. Optionally, the HC structure and substrate are bonded or otherwise attached to a space vehicle, and the HC structure can be tested in place, before the TP blocks are inserted.

Figure 3:
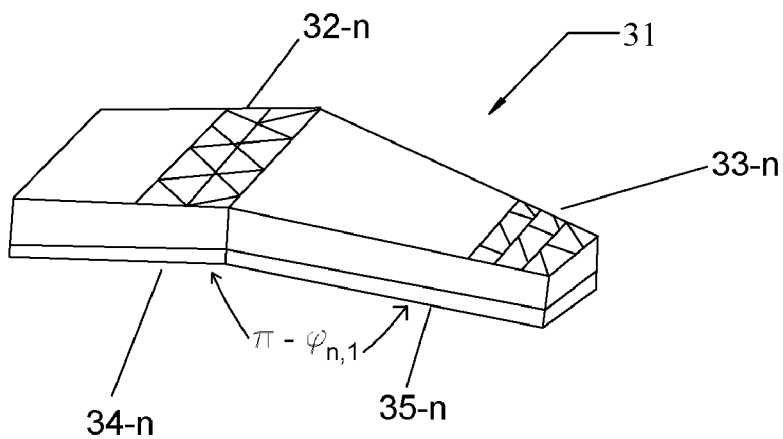
FIGS. 3 and 5 illustrate positioning of different honeycomb matrices on heat shield wedge segments according to the invention.
Figure 4:
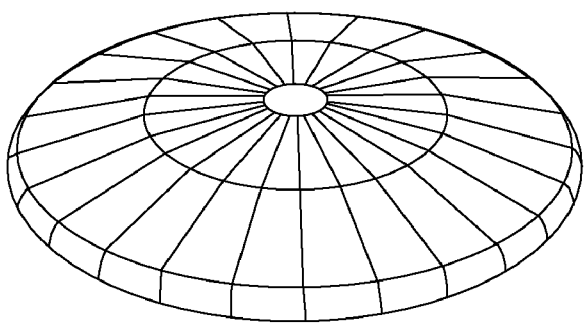
FIG. 4 illustrates assembling of a plurality of heat shield segments from FIG. 3 to protect an end surface of an entrant vehicle from atmospheric heating.

FIG. 3 illustrates positioning of two adjacent HC structures, 32-$n$ and 33-$n$, on respective substrates, 34-$n$ and 35-$n$ ($n=1, \ldots, N$; $N \geq 3$), as part of an embodiment of the heat shield invention 31. The substrate pairs, 34-$n$ and 35-$n$, are preferably planar, oriented at a non-zero angle $\phi_{n,1}$ relative to each other, and N substrate pairs are assembled as part of a faceted substrate, to provide a heat shield in this embodiment, as illustrated in FIG. 4. Each of the HC structures, 32-$n$ and 33-$n$, in FIG. 3 may have an independently chosen pattern or HC aperture shape, such as one of the patterns shown in FIGS. 1A-1G, and a TP block having an appropriate cross sectional shape is inserted into an HC aperture, as illustrated in FIG. 2. At least three such HC structures and corresponding substrates are present in one embodiment of the invention.

Figure 5:
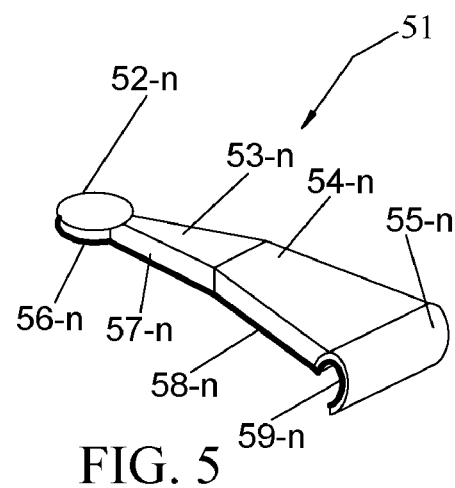

FIG. 5 illustrates use of four adjacent HC structures, 52-$n$, 53-$n$, 54-$n$ and 55-$n$, positioned on four corresponding substrates, 56-$n$, 57-$n$, 58-$n$ and 59-$n$, respectively. The HC structure 55-$n$ and substrate 59-$n$ form a shoulder that wraps around a portion of the entrant vehicle surface.

What is claimed is:

1. A thermal protection system for atmospheric entry of a vehicle, the system comprising:

a first assembly of first honeycomb components, each first honeycomb component having a first honeycomb component material composition, having at least three first honeycomb component walls, each first honeycomb component wall having substantially the same first honeycomb component diameter and having substantially the same first honeycomb component cross sectional shape, the first honeycomb components being connected together to form a first honeycomb matrix, where each first honeycomb component in the first honeycomb matrix receives and holds a first honeycomb thermal protection block having at least three first honeycomb thermal protection block side walls, where the first honeycomb thermal protection block is a selected first thermal protection block material, where the first assembly is located on and connected to a first substrate, and where at least first and second first honeycomb thermal protection block side walls are attached to first and second first honeycomb component walls, respectively;

a second assembly of second honeycomb components, each second honeycomb component having a second honeycomb component material composition, having at least three second honeycomb component walls, each second honeycomb component wall having substantially the same second honeycomb component diameter and having substantially the same second honeycomb component cross sectional shape, the second honeycomb components being connected together to form a second honeycomb matrix, where each second honeycomb component in the second honeycomb matrix receives and holds a second honeycomb thermal protection block having at least three second honeycomb thermal protection block side walls of a second honeycomb component, where the second honeycomb thermal protection block is a selected second thermal protection block material, where the second assembly is located on and connected to a second substrate, where at least first and second honeycomb thermal protection block side walls are attached to first and second honeycomb component walls, respectively, and where the first and second substrates are substantially planar and are oriented at a non-zero angle relative to each other;

where at least one of the first honeycomb thermal protection blocks is thermally cured before insertion of the at least one of the first honeycomb thermal protection blocks into the first assembly of the first honeycomb components, and where at least one of the second honeycomb thermal protection blocks is thermally cured before insertion of the at least one of the second honeycomb thermal protection blocks into the second assembly of the second honeycomb components;

where each of the first honeycomb thermal protection blocks has a first honeycomb thermal protection block first end that is exposed to an atmosphere having re-entry temperatures and has a first honeycomb thermal protection block second end that is attached to the first substrate, and at least one of the first honeycomb thermal protection blocks is thermally cured before insertion of the at least one first honeycomb thermal protection block into the first assembly of the first honeycomb components; and where each of the second honeycomb thermal protection blocks has a second honeycomb thermal protection block first end that is exposed to the atmosphere having re-entry temperatures and has a second honeycomb thermal protection block second end that is attached to the second substrate.

2. The system of claim 1, wherein at least one of said second honeycomb thermal protection blocks in said second substrate is thermally cured before insertion of the at least one second honeycomb thermal protection block into said second assembly of said second honeycomb components.

3. The system of claim 1, wherein said first honeycomb material includes silicon phenolic.

4. The system of claim 1, wherein said second honeycomb material includes silicon phenolic.

5. The system of claim 1, wherein said first thermal protection block material includes at least one of a group of thermal protection materials consisting of PICA, SLA and carbon ablator.

6. The system of claim 1, wherein said second thermal protection block material includes at least one of a group of thermal protection materials consisting of PICA, SLA and carbon ablator.

7. The system of claim 1, wherein said selected first thermal protection block material and said selected second thermal protection block material are substantially the same material.

8. The system of claim 1, wherein said first honeycomb shape for said first honeycomb components is drawn from the group consisting of regular triangles, isosceles triangles, right triangles, symmetric trapezoids, rectangles, squares and regular hexagons.

9. The system of claim 1, wherein said second honeycomb shape for said second honeycomb components is drawn from the group consisting of regular triangles, isosceles triangles, right triangles, symmetric trapezoids, rectangles, squares and regular hexagons.

10. The system of claim 1, wherein at least one of said first honeycomb component thermal protection block side walls is not attached by an adhesive to any of said first honeycomb component walls.

11. The system of claim 10, wherein at least one of said second honeycomb component thermal protection block side walls is not attached by an adhesive to any of said second honeycomb component walls.

12. The system of claim 1, wherein each of said first honeycomb component thermal protection block side walls is attached by an adhesive to at least one of said first honeycomb component walls.

13. The system of claim 12, wherein each of said second honeycomb component thermal protection block side walls is attached by an adhesive to at least one of said second honeycomb component walls.

14. The system of claim 1, wherein said cross sectional shape of said first honeycomb components differs from said cross sectional shape of said second honeycomb components.

15. The system of claim 1, wherein said diameter of said first honeycomb components differs from said diameter of said second honeycomb components.

16. The system of claim 1, wherein said first honeycomb component material differs from said second honeycomb component material.

* * * * *